United States Patent [19]

Repetti

[11] Patent Number: 5,087,093
[45] Date of Patent: Feb. 11, 1992

[54] HINGED COVER FOR PICK-UP TRUCKS

[76] Inventor: Thomas A. Repetti, 2219 Ave. C, Bradenton Beach, Fla. 34217

[21] Appl. No.: 701,055

[22] Filed: May 16, 1991

[51] Int. Cl.5 ............................................. B60P 7/02
[52] U.S. Cl. ....................................................... 296/100
[58] Field of Search ................... 296/100; 160/32, 35, 160/36, 130, 187

[56] References Cited

U.S. PATENT DOCUMENTS

| 3,762,763 | 10/1973 | Deshores | 296/100 |
| 3,768,858 | 10/1973 | Boismier | 296/100 |
| 4,418,954 | 12/1983 | Buckley | 296/100 |
| 4,946,217 | 8/1990 | Steffens et al. | 296/100 |

Primary Examiner—Robert R. Song
Attorney, Agent, or Firm—Charles I. Brodsky

[57] ABSTRACT

The apparatus of the invention, when closed, serves to fully close and cover the bed of a pick-up truck. In a preferred embodiment, it incorporates four sections, the first of which is permanently affixed to the bed adjacent to the cab of the pick-up. A second section of the apparatus connects to the first by means of a hinge coupled to the two sections on their top surfaces, along their facing edges. A third section of the apparatus similarly connects to the second section, by means of a hinge coupled to the two on their top surfaces, likewise along their facing edges. The fourth section of the apparatus connects to the third section, again along their facing edges, but this time by means of a hinge coupled to the two sections on their underside surfaces, with the fourth section being releasably secured to the bed at its rear end. When the bed is to be uncovered, the fourth section is released from its securement, and folded together with the third and second sections onto the first section where the second, third and fourth sections are then tied off, to be there held in place.

7 Claims, 4 Drawing Sheets

HINGED COVER FOR PICK-UP TRUCKS

FIELD OF THE INVENTION

This invention relates to pick-up trucks, in general, and to a hinged cover for the bed of a pick-up truck, in particular.

BACKGROUND OF THE INVENTION

As is well known and understood, covers for the beds of pick-up trucks are desirably manufactured of a composition as to make them rust-proof, and without any need for re-painting after years of use. Arrangements for their installation also are desirably such as to make the bed both secure and generally impervious to weather and precipitation. Present-day designs also exist to make such covers aerodynamically efficient, so as not to impair gas efficiency when operating the pick-up truck, and are positioned along the edges of the bed so as to make the cover easily removable when it is desired to transport items of significant height.

While those covers available today satisfy these conditions, they suffer the disadvantage of creating a storage problem for the cover itself, once it is removed. For example, one manufacture of a cover for the bed of a pick-up truck comprises a plurality of individually removable sections that lock into place when the bed is to be covered, but when the sections are removed, they are of such size, weight and bulk, that the mere storage of them themselves takes up a significant portion of the available bed space, or requires that the sections be placed alongside the driver, in the cab compartment of the pick-up truck, when transporting the cargo about.

It is thus an object of the present invention to provide a cover for a pick-up truck, new and unique in its design, which exhibits all the desirable features of presently available covers for pick-up trucks, but one which allows easy and convenience storage of its individual sections when the bed is loaded.

It is another object of the invention to provide such a cover which can be part of an original manufacture of the pick-up truck, or one which could be added to an already existing pick-up truck simply and inexpensively by its owner.

SUMMARY OF THE INVENTION

As will become clear from the description that follows, the apparatus of the invention, when closed, serves to fully close and cover the bed of a pick-up truck. In a preferred embodiment, it incorporates four sections, the first of which is permanently affixed to the bed adjacent to the cab compartment of the pick-up. A second section of the apparatus connects to the first by means of a hinge coupled to the two sections on their top surfaces, along their facing edges. A third section of the apparatus similarly connects to the second section, by means of a hinge coupled to the two on their top surfaces, likewise along their facing edges. The fourth section of the apparatus connects to the third section, again along their facing edges, but this time by means of a hinge coupled to the two sections on their underside surfaces, with the fourth section being releasably secured to the bed at its rear end. When the bed is to be uncovered, the fourth section is released from its securement, and folded together with the third and second sections onto the first section where the second, third and fourth sections are then tied off, to be there held in place. As will be seen, when folded over, the situation becomes where the amount of bed-space lost is substantially represented only by the depth of the first section of the hinged-cover, and, in accordance with the embodiment to be described, is of the order of some 6".

BRIEF DESCRIPTION OF THE DRAWINGS

These and other features of the invention will be more clearly understood from a consideration of the following description, taken in connection with the accompanying drawings, in which.

DETAILED DESCRIPTION OF THE DRAWINGS

Figure 1:
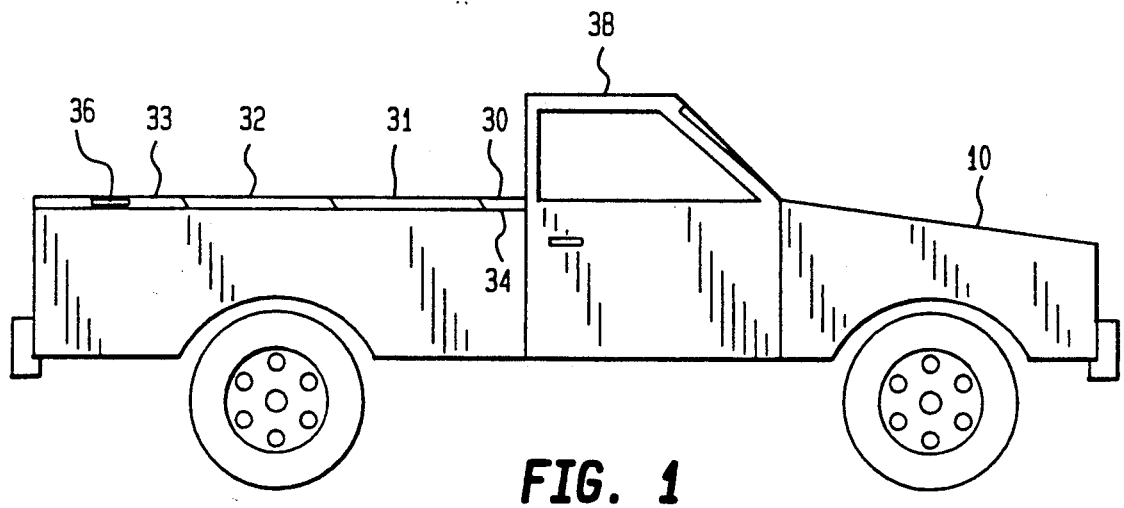
FIG. 1 is an illustration of a side view of a pick-up truck helpful in an understanding of the invention.
Figure 2:
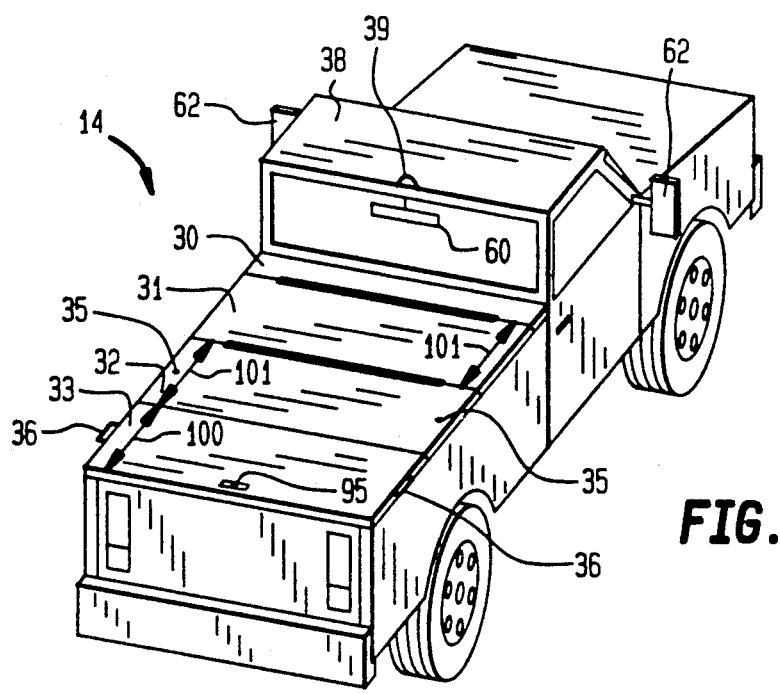
FIG. 2 is a top view of the pick-up truck of FIG. 1 showing the cover of the invention as it would appear when the bed of the pick-up truck is covered.
Figure 3:
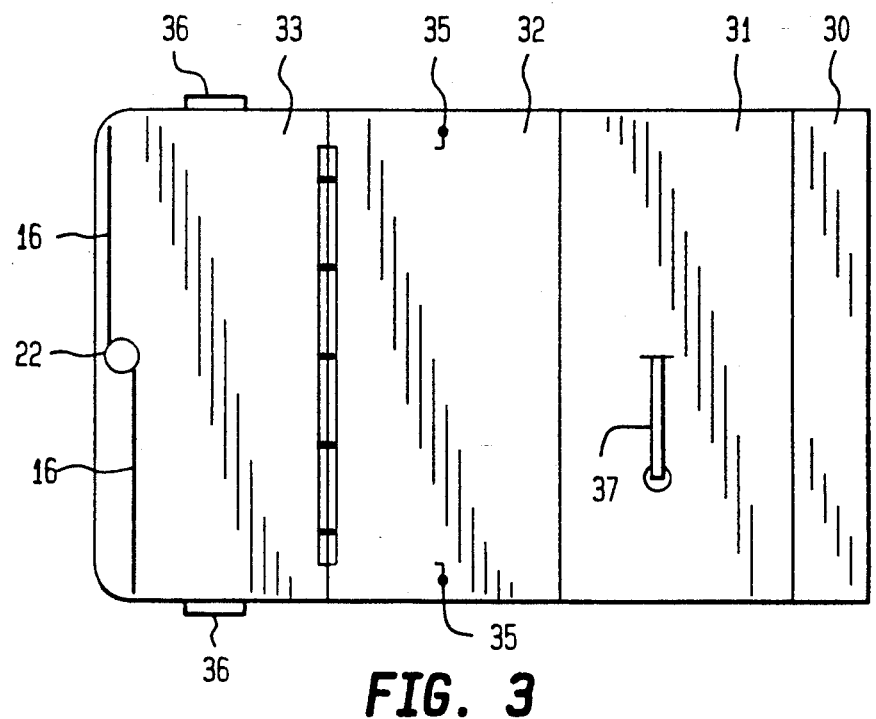
FIG. 3 is a bottom view of the cover of the invention.
Figure 4:
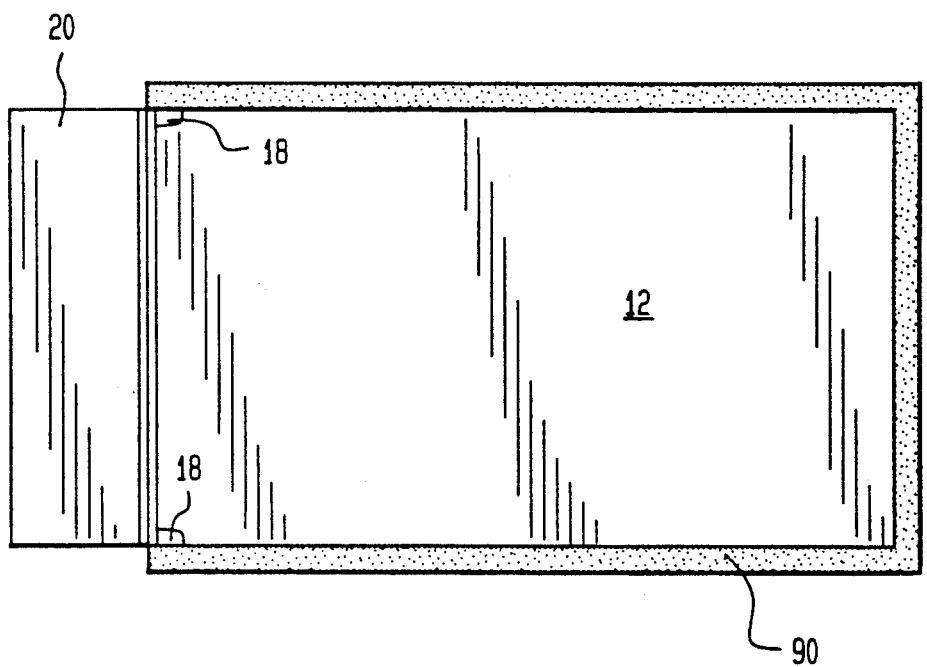
FIG. 4 is a top view of the bed of the pick-up truck prior to the installation of the cover of the invention.

In the drawings, reference numeral 10 identifies the pick-up truck having a bed 12 which is normally closed-off by means of a cover 14 which incorporates a pair of metal rods 16 (FIG. 3) that extend into a pair of holes 18 (FIG. 4) in securement to the tailgate 20 (FIG. 4), until they are releasably unlocked, as by means of a key, at 22 (FIG. 3). In this manner, the cover 14 provides a comparable degree of security to items stored in the bed of the pick-up truck, in a manner akin to the securement of items stored in the trunk of a passenger motor vehicle.

As shown in FIGS. 1–3 and 7–8, a cover constructed in accordance with the present invention comprises four sections 30–33. As will be understood, the section 30 is permanently secured to the top of the bed 12, as at 34, while the rods 16 are incorporated in the section 33 for releasably securing that end of the cover to the bed until it is time for its loading. A pair of pressure locks—as of the type which releasably hold the hood of a motor vehicle in place—is incorporated at an edge of the section 32, as at 35, in additionally serving to hold the cover 14 in position when the bed 12 is to be closed. To facilitate the opening of the bed 12, a pair of handles 36 are incorporated on opposite sides of the section 33, and a strap 37 is included on the underside of section 31 to be employed, as will be described below, in tying the cover 14 to the top of the cab compartment 38 of the pick-up truck, in cooperation with a hook attachment there positioned, as at 39.

Referring to the cover 14, itself, it will be first understood that the four sections 30–33, when closed entirely cover the bed 12 of the pick-up truck 10 side-to-side, and front-to-back. Spanning the edges 30b of section 30 and 41a of section 31 (FIG. 7) a first hinge 40 is utilized, across the top surface of the sections 30, 31, from left-toright, as shown. Spanning the facing edges 31b of section 31 and 32a of section 32, a like hinge 41 is utilized, also across the top surface of the sections 31, 32, in likewise left-to-right direction. Likewise spanning in left-to-right direction across the sections 32, 33, across their facing edges 32b, 33a respectively, is a third hinge 42, this time, however, across the underside surfaces of the sections 32, 33, as compared with a spanning across the top surfaces of the sections 31, 32 and 30, 31 by the hinges 41, 40.

Figure 5A:
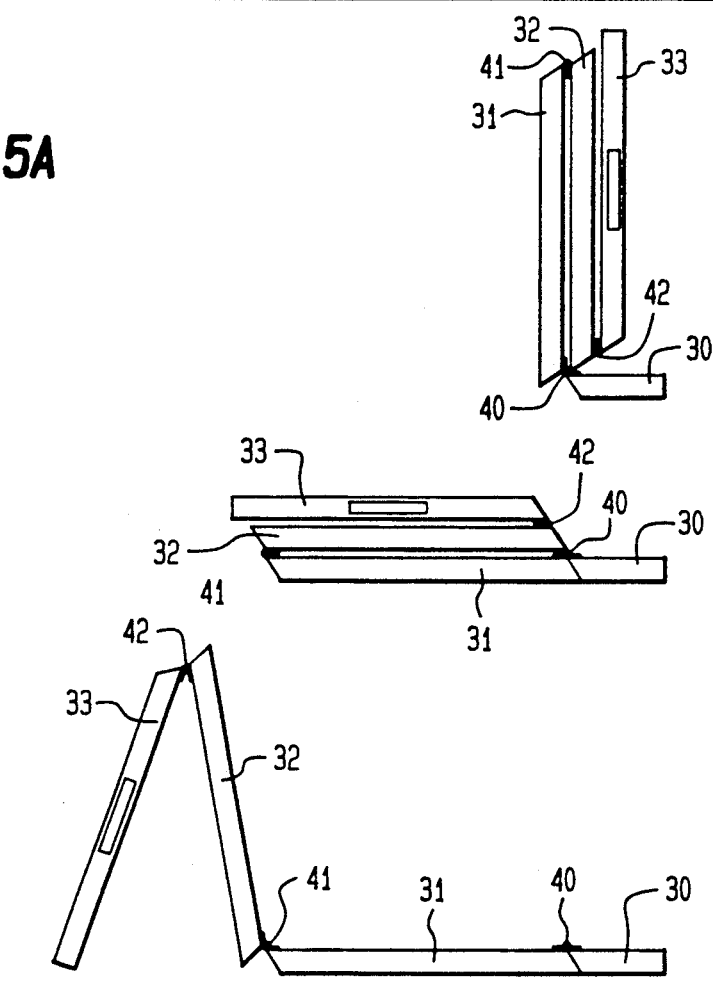
FIGS. 5a and 5b are illustrations helpful in an understanding of the manner by which the cover of the invention is releasably secured from its previous closed position, and stored to allow full use of the bed for the loading of cargo and for its transporting.
Figure 5B:
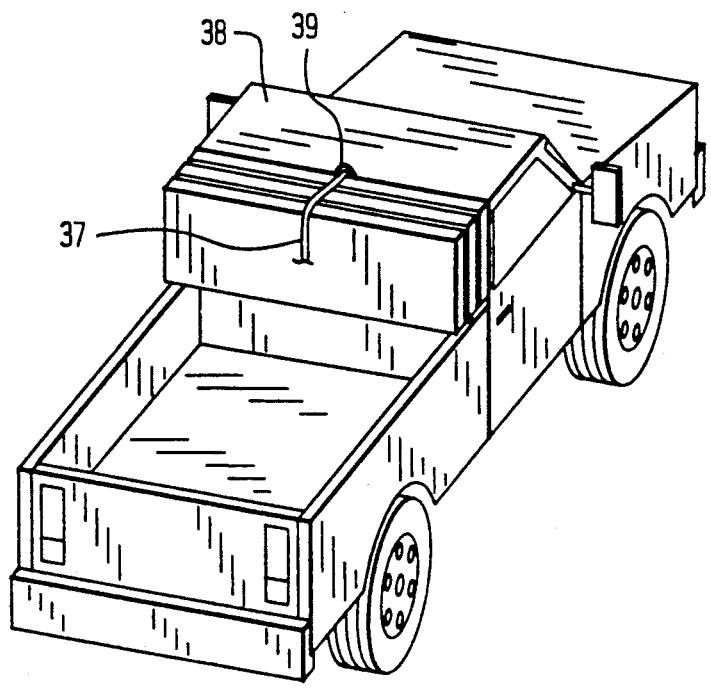

As will be appreciated by those skilled in the art when it is desired to open the bed 12 so as to load cargo, the lock 22 is opened, and the rods 16 removed, all that is then necessary is to grasp the handles 36 to fold the section 33 together with the section 32 about the hinge 42 (FIG. 5a), then continuing to fold them both atop the section 31 by means of the hinge 41, and to then fold the sections 31, 32, 33 once more about the hinge 40 until the three sections 31, 32, 33 seat atop the section 30. The strap 37 on the underside of the section 31 then hooks to the securement 39 atop the cab compartment so that the sections 31, 32, 33 are held in place with the cargo loaded in the bed 12 (FIG. 5b). While such orientation of the sections serve to obstruct the rear view mirror 60 of the pick-up truck, continued vision can be had through either the left or right side view mirrors 62, for the usually short drive involved in transporting the cargo from place to place.

In a preferred construction of the present invention, the cover 14 can be fabricated of any appropriate material although a heavy vinyl has been determined to be preferable to any metallic or wood composition. In accordance with the preferred construction, additionally, the rear-most section 33 is selected of a depth dimension 100 slightly larger than the depth dimension 101 of the sections 31, 32, so that the sections 31, 32, 33—when folded over to seat atop the section 30—all rise to the same approximate height.

Figure 6:
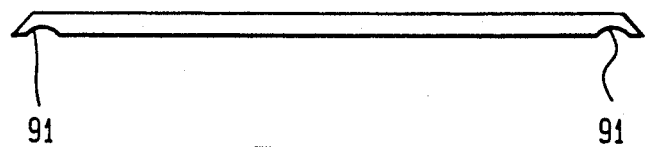
FIGS. 6 and 7 respectively show the rear and side views of the cover of the invention when secured in place to close-off the bed of the pick-up.
Figure 7:
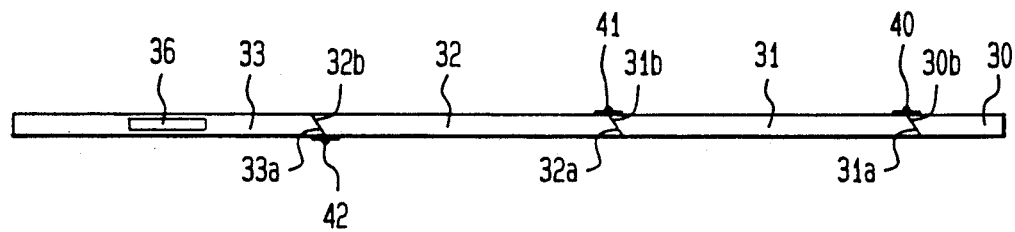
Figure 8:
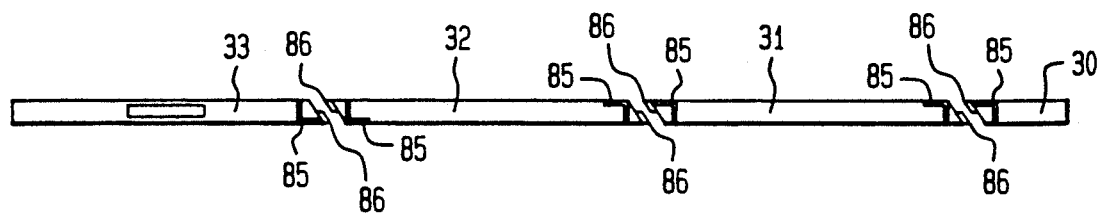
FIG. 8 is a more detailed side view of the cover showing arrangements to enhance the support of the cover and to improve its water-tightness, both in accordance with the teachings of the invention.

So as to enhance the water resistancy of the bed 12 with the cover 14 in place, an installation according to the invention would first encompass the securement of a rubber-type seal 90 at the top sides and rear of the bed 12—for example, of a metallized composition with a rubber or foam backing to shield the entry of water (or moisture) and to cut down the possibility of noise produced by wind resistance. In accordance with the invention, such seal can be of the order of 1"-1½" thick, and with the thickness of the sections 31, 32, 33 being likewise of a 1"-1½" thick so as to take up the order of 6" of bed space when the sections 31-33 are seated atop the section 30. FIG. 6 shows the rear view of the cover 14, provided with cut-outs 91 to fit over the seal 90 secured along the sides of the bed 12. As shown in FIG. 8, added support can be provided to stiffen the sections 31, 32, 33, by means of inserted angle irons 85, and if desired, additional rubber bushings 86 can be incorporated along the face edges of the sections to enhance the degree of water resistance presented.

As will be readily apparent to those skilled in the art, the various parts described above can be incorporated as part of an original manufacture of the pick-up truck. Alternatively, and as easily understandable, the component parts can be added on later as an accessory—merely by permanently drilling the section 30 to the bed frame, and drilling the seal 91 in place. The cover 14 is then easily connectable in cooperating relationship with the seal 90 and the section 30, merely by correctly positioning the facing edges of the sections 30 and 31 and attaching the hinge 40 into position. If so desired, arrangements can be made to add additional features to the configuration—such as the inclusion of a pop-up lock 95 coupling the section 33 with the bed frame, whereby the section 33 is arranged to easily release from the bed frame merely upon the manual depression of the pop-up lock 95, or by controllably releasing it from inside the cab in any known manner.

While there have been described what are considered to be preferred embodiments of the present invention, it will be readily apparent to those skilled in the art that modifications can be made without departing from the scope of the teachings herein. Thus, whereas the apparatus of the invention has been described as being composed of a three-piece hinged section, additional sections can be added, and, in fact, through proper arrangement of hinges, even a two-piece section can be utilized for the cover, without departing from the scope of the teachings herein. For at least such reasons, therefore, resort should be had to the claims appended hereto for a true understanding of the scope of the invention.

I claim:

1. Apparatus for detachably covering the bed of a pick-up truck, comprising:
   first, second and third sections individually extending across a first dimension of said bed, with said first section being permanently affixed to said bed, with said second section being releasably secured to said bed, and with said third section being positioned between said first and second sections;
   a first pair of facing edges on said first and third sections;
   a second pair of facings edges on said second and third edges;
   a first hinge coupled to the top surfaces of said first and third sections along said first pair of facing edges;
   a second hinge coupled to the underside surfaces of said second and third sections along said second pair of facing edges;
   securement means at a top portion of the cab of said pick-up truck;
   and means coupling an underside surface of said third section to said securement means for detachably securing said second and third sections in position when folded onto said first section through rotation of said second and third sections about said first and second hinges.

2. The apparatus of claim 1 wherein said first, second and third sections taken together extend across a second dimension of said bed to substantially cover said bed prior to rotation of said second and third sections.

3. The apparatus of claim 2, wherein said second section includes a pair of rods extending from opposing sides of said pick-up truck to releasably lock said second section in place prior to rotation of said second and third sections.

4. The apparatus of claim 2 wherein said first and second pairs of facing edges include interconnecting surfaces of composition to afford a degree of watertightness to the bed when said bed is covered by said second and third sections.

5. The apparatus of claim 2 wherein said second section is of a depth of said third section so as to align said second and third sections when rotated onto said first section.

6. The apparatus of claim 2 wherein said third section comprises a pair of sections A and B, each having opposing edges; wherein said first hinge is coupled to the top surfaces of said first section and to the top surface of said section A, wherein said second hinge is coupled to the underside surface of said second section and to the underside surface of said section B, wherein there is additionally included a third hinge coupled to the top surface of said section A and to the top surface of said section B, and wherein said first, second and third hinges are connected along adjacent edges of said first, second A and B sections.

7. The apparatus of claim 2 wherein said first and second dimensions of said bed are its width and length, respectively.

* * * * *